US006886784B1

United States Patent
Howe

(10) Patent No.: US 6,886,784 B1
(45) Date of Patent: May 3, 2005

(54) HIGH PRESSURE SPRAY SYSTEM

(76) Inventor: Richard Howe, 36,880 Washington Loop Rd., Punta Gorda, FL (US) 33982

( * ) Notice: Subject to any disclaimer, the term of this patent is extended or adjusted under 35 U.S.C. 154(b) by 0 days.

(21) Appl. No.: 10/687,613

(22) Filed: Oct. 20, 2003

(51) Int. Cl.$^7$ .............................. B64D 1/00; B64D 1/18
(52) U.S. Cl. ..................................................... 244/136
(58) Field of Search .......................... 244/136; 169/53; 239/171

(56) References Cited

U.S. PATENT DOCUMENTS

| | | | | | |
|---|---|---|---|---|---|
| 2,048,847 | A | * | 7/1936 | Desmet | 244/136 |
| 2,537,251 | A | * | 1/1951 | Wilson | 244/136 |
| 2,665,092 | A | * | 1/1954 | Sands | 244/136 |
| 2,924,040 | A | * | 2/1960 | White et al. | 239/171 |
| 3,398,893 | A | * | 8/1968 | Rasovich et al. | 244/136 |
| 3,589,613 | A | * | 6/1971 | Saladin | 239/171 |
| 3,945,572 | A | * | 3/1976 | Bockenstette, II | 239/171 |
| 4,034,915 | A | * | 7/1977 | Garner | 239/171 |
| 4,090,567 | A | * | 5/1978 | Tomlinson | 169/53 |
| 2001/0019090 | A1 | * | 9/2001 | Horev | |

* cited by examiner

Primary Examiner—Michael J. Carone
Assistant Examiner—L. Semunegus
(74) Attorney, Agent, or Firm—Frank A. Lukasik

(57) ABSTRACT

A combination of an aircraft and spraying apparatus for spraying suspensions or solutions having predetermined characteristics independent of the speed of the aircraft, the apparatus consisting of a mounting frame attached to the underside of the aircraft, a plurality of bearing braces attached to the frame and a propeller shaft mounted through the bearing braces. A full feathering propeller is mounted on the forward end with a control running to the cockpit of the aircraft, and a rotary piston type high pressure pump connected to the aft end of the propeller. The input of the pump is connected to a supply tank in the aircraft and the output is connected to a spray boom. The spray nozzles consist of high pressure impingement nozzles.

2 Claims, 4 Drawing Sheets

Average Process Control Variables
Valid Data Record
Material : 8005 dibrom     Lot : 50psi 140 mph

Standard Values:
Transmission = 71.76%      Dv(10) = 24.91 (μm)      Span = 1.67
Cv = 366.6 (PPM)           Dv(50) = 85.06 (μm)      D[3][2] = 40.86 (μm)
SSA = 0.147 (m^2/cc)       Dv(90) = 167.35 (μm)     D[4][3] = 93.55 (μm)

| Title | Average | Standard Deviation | Max | Min |
|---|---|---|---|---|
| Dv(10.0) (μm) | 30.96 | 16.32 | 102.71 | 6.71 |
| Dv(50.0) (μm) | 81.77 | 19.96 | 140.90 | 41.54 |
| Dv(90.0) (μm) | 167.19 | 10.68 | 196.43 | 141.22 |
| % Volume < 30.0 | 13.20 | 10.60 | 39.42 | 0.02 |
| % Volume < 50.0 | 27.75 | 14.24 | 56.07 | 0.59 |
| 7.0 < % Volume < 22.0 : Avg | 5.06 | 3.07 | 8.19 | 0.01 |

FIG. 5

Average Process Control Variables
Valid Data Record
Material : pj12 dibrom          Lot : 6000 psi 140 mph

Standard Values:
Transmission = 33.25%        Dv(10) = 2.33 (μm)         Span = 1.95
Cv = 154.0 (PPM)             Dv(50) = 10.75 (μm)        D[3][2] = 5.44 (μm)
SSA = 1.104 (m^2/cc)         Dv(90) = 23.25 (μm)        D[4][3] = 12.25 (μm)

| Title | Average | Standard Deviation | Max | Min |
|---|---|---|---|---|
| Dv(10.0) (μm) | 4.07 | 3.97 | 18.22 | 1.53 |
| Dv(50.0) (μm) | 10.50 | 4.20 | 23.36 | 6.47 |
| Dv(90.0) (μm) | 22.21 | 2.59 | 47.66 | 17.41 |
| % Volume < 30.0 | 96.18 | 2.11 | 98.98 | 81.01 |
| % Volume < 50.0 | 99.35 | 0.79 | 100.00 | 90.21 |
| 7.0 < % Volume < 22.0 : Avg | 57.40 | 7.04 | 71.73 | 46.80 |

FIG. 6

HIGH PRESSURE SPRAY SYSTEM

BACKGROUND OF THE INVENTION

A. Field of the Invention

The present invention relates to spraying apparatus and more particularly to spraying apparatus for spraying suspensions or solutions from a fixed wing aircraft having predetermined characteristics independent of the speed of the aircraft carrying out the spraying.

B. Description of the Prior Art

Mosquito-borne diseases affect millions of people worldwide each year. In the United States, some species of mosquitoes can transmit diseases such as enciphalitis, dengue fever, and malaria to humans, and a variety of diseases to wildlife and domestic animals. To combat mosquitoes and the public health hazards they present, many states and localities have established mosquito control programs. These programs, which are based on surveillance, can include nonchemical forms of prevention and control as well as ground and aerial application of chemical and biological pesticides.

The first step in mosquito control is surveillance. Mosquito specialists conduct surveillance for diseases harbored by domestic and non-native birds, including sentinel chickens (used as virus transmission indicators), and mosquitoes. Surveillance for larval habitats is conducted by using maps and aerial photographs and by evaluating larval populations. Other techniques include various light traps, biting counts, and analysis of reports from the public. Mosquito control programs also put high priority on trying to prevent a large population of adult mosquitoes from developing so that additional controls may not be necessary. Since mosquitoes must have water to breed, methods of prevention may include controlling water levels in lakes, marshes, ditches, or other mosquito breeding sites, eliminating small breeding sites if possible, and stocking bodies of water with fish species that feed on larvae. Both chemical and biological measures may be employed to kill immature mosquitoes during larval stages. Larvicides target larvae in the breeding habitat before they can mature into adult mosquitoes and disperse. Larvicides include the bacterial insecticides *Bacillus thuringiensis israelensis* and *Bacillus sphaericus*, the insect growth inhibitor methoprene, and the organophosphate insecticide temephos. Mineral oils and other materials form a thin film on the surface of the water which cause larvae and pupae to drown. Liquid larvicide products are applied directly to water using backpack sprayers and truck or aircraft-mounted sprayers. Tablet, granular, and briquet formulations of larvicides are also applied by mosquito controllers to breeding areas.

Adult mosquito control may be undertaken to combat an outbreak of mosquito-borne disease or a very heavy nuisance infestation of mosquitoes in a community. Pesticides registered for this use are adulticides and are applied either by aircraft or on the ground employing truck-mounted sprayers. State and local agencies commonly use the organophosphate insecticides malathion and naled and the synthetic pyrethroid insecticides permethrin, and sumithrin for adult mosquito control.

Mosquito adulticides are applied as ultra-low volume (ULV) spray. ULV sprayers dispense very fine aerosol droplets that stay aloft and kill flying mosquitoes on contact. ULV applications involve small quantities of pesticide active ingredient in relation to the size of the area treated, typically less than 3 ounces per acre, which minimizes exposure and risks to people and the environment. Some communities have thermal foggers that use an oil carrier that is heated to disperse the pesticide in a dense smoke-like fog.

The best time to kill adult mosquitoes by fogging is at dusk, when they are most active and looking for food (mosquitoes feed on human or animal blood). The aerosol fog primarily targets flying mosquitoes, which is why the timing of the spray is critical.

The most commonly used products are synthetic pyrethroid insecticides (such as Scourge and Anvil), pyrethrins and malathion. All insecticides used for mosquito control must be registered with the U.S. Environmental Protection Agency (EPA). During the fogging, flying mosquitoes within the treated area are killed. Although the local mosquito population is reduced for a few days, fogging does not prevent mosquitoes from re-entering the area.

Currently, ultra-low volume (ULV) applications of adulticides represent one of the most widely used and effective methods for control of mosquitoes in urban and suburban areas. Experiments to determine the relationship between insecticidal droplet size and kill of adult mosquitoes were conducted using laboratory wind tunnel tests with monodisperse aerosols and field tests with ground ULV aerosol generators. Previous research has shown that the effectiveness of these applications is fundamentally related to the particle or droplet size of the aerosol. This is particularly true for applications which depend on direct contact of the insecticide with the insect body.

Latta et al. (1947) conducted a laboratory wind tunnel study with uniform droplet sizes of DDT which indicated that 12 to 20 $\mu$m diameter was optimum for adult mosquito control with wind velocities of 2 to 8 mph. La Mer et al. (1947) indicated that the optimum droplet size for mosquito control was 15.8 $\mu$m in a theoretical analysis. Mount et al. (1968) reported that malathion aerosols with 6 to 10 $\mu$m volume median diameter (VMD) were more effective with 11 to 22 $\mu$m VMD when applied with truck-mounted equipment in field tests with caged mosquitoes.

SUMMARY OF THE INVENTION

The present invention provides a Hi-Pressure Spray System. The system is designed to dispense mosquito control pesticide. The power section consists of a mounting frame to be attached to an aircraft. Its primary advantage is universal adaptability to anything that flies and the ability to achieve a tenfold increase in product efficiency. Attached to the frame are two propeller shaft bearings. A propeller shaft is mounted between the shaft bearings. A full "feathering" propeller is mounted on the forward end of the propeller shaft. A piston type high pressure pump is mounted on the aft end of the propeller shaft. A feathering control is attached to the propeller hub and connected to a control in the cockpit of the aircraft. A pesticide supply line is connected to the input of the piston type pump. A spray boom, mounted on the frame, is connected to the output of the pump. The spray boom has a plurality of impingement nozzles mounted therein.

BRIEF DESCRIPTION OF THE DRAWINGS

The invention will now be described by way of example with reference to the accompanying drawings in which:

FIG. 5 is a chart showing the average process control variables at 50 psi.

FIG. 6 is a chart showing the average process control variables at 6000 psi.

BEST MODE OF CARRYING OUT THE INVENTION

Figure 1:
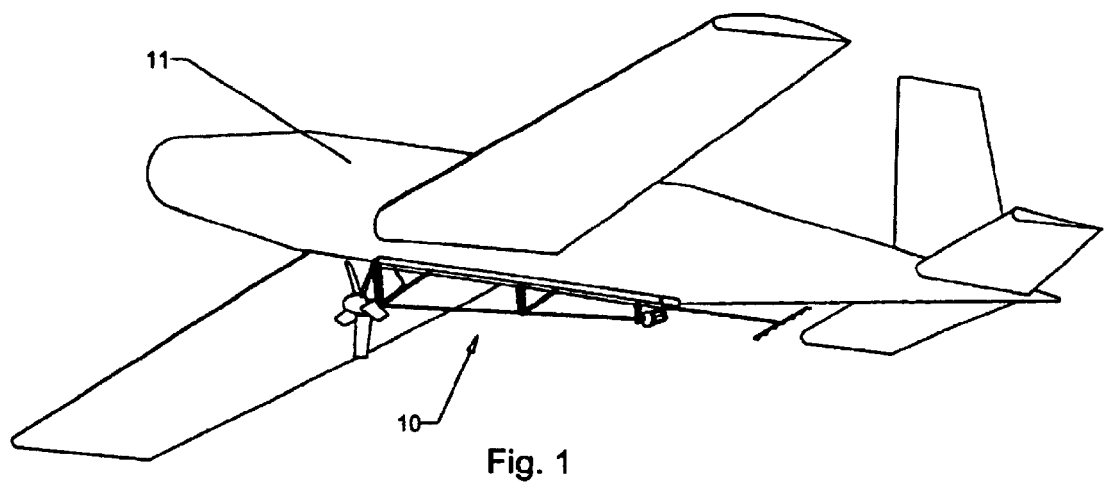
FIG. 1 is a bottom perspective view of the invention attached to the underside of an aircraft.
Figure 2:
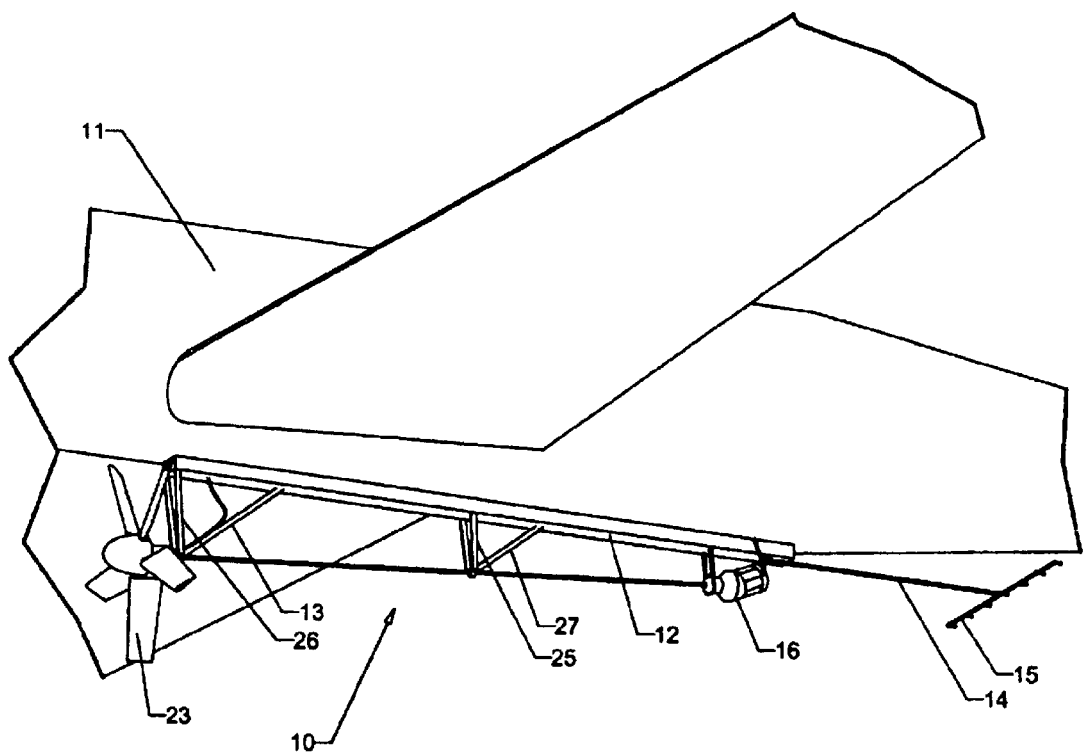
FIG. 2 is a close-up bottom perspective view of the invention attached to the underside of an aircraft.
Figure 3:
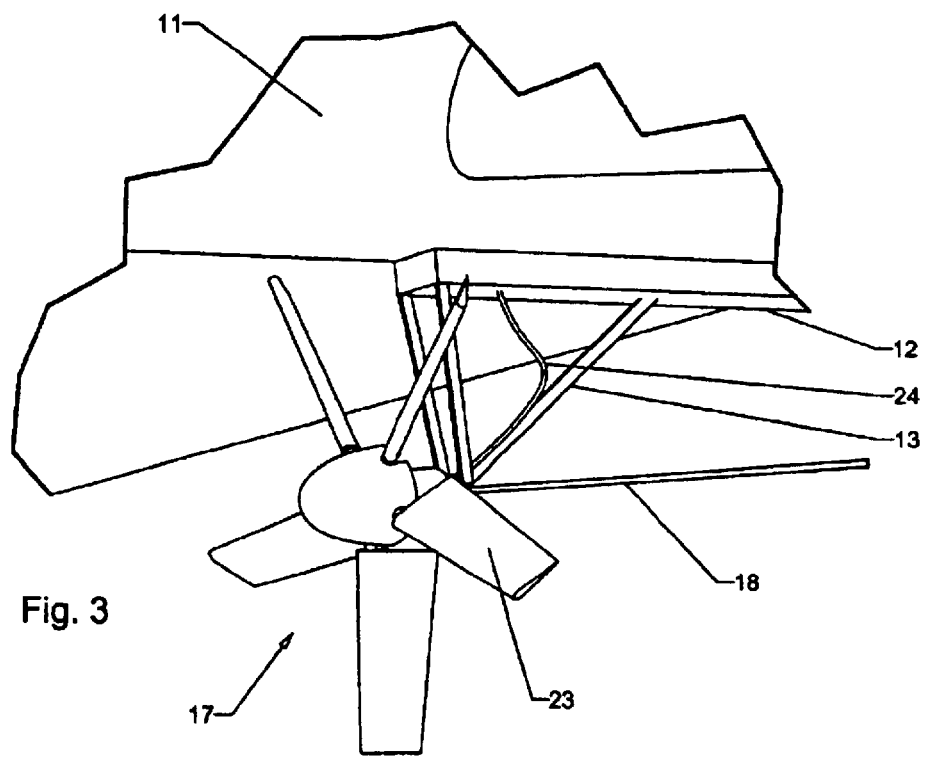
FIG. 3 is a close-up bottom perspective view of the feathering prop mounting.
Figure 4:
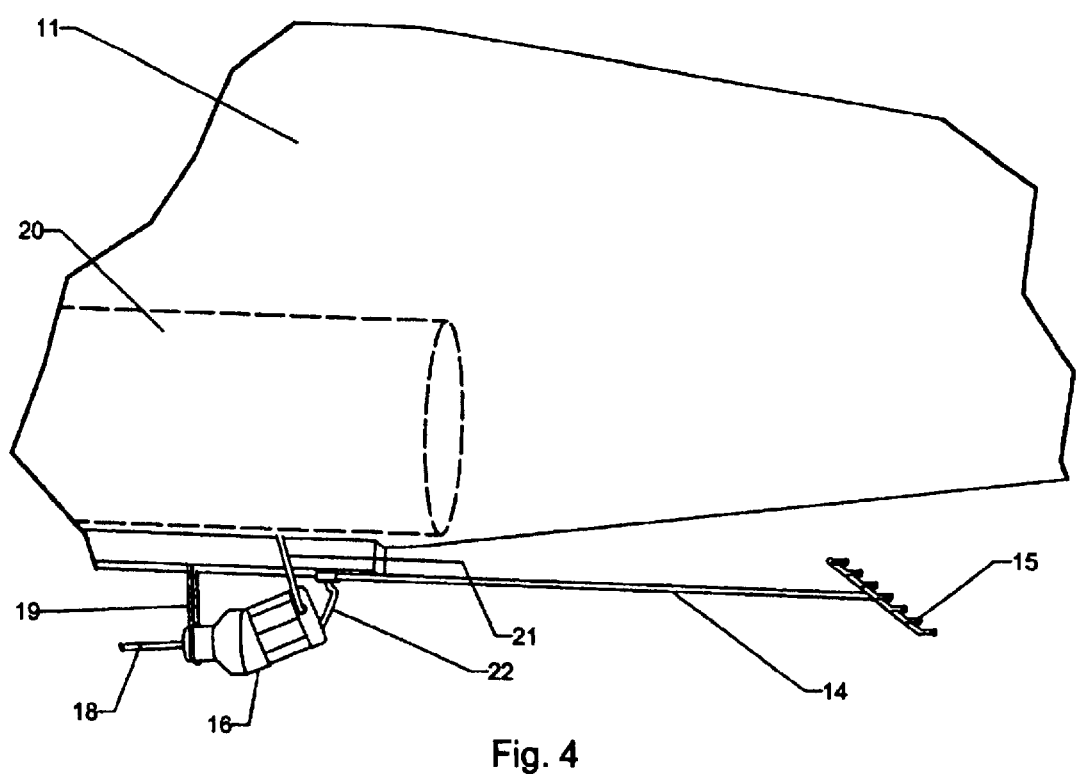
FIG. 4 is a close-up bottom perspective view of the pump and spray boom attached to the bottom of an aircraft.

As shown in the accompanying figures, a high pressure spray system 10 is attached to the underside of an aircraft 11. A base mounting frame 12 is attached to the underside of the fuselage or to the underside of a wing of the aircraft 11. Attached to the frame 12, are two bearing braces 25 and 26. Bearing brace 25 is reinforced with bracket 13 and bearing brace 26 is reinforced with bracket 27. Propeller shaft 18 is mounted through the bearing braces 25, and 26. A full feathering propeller 23 is mounted on the forward end of shaft 18. Feathering is controlled from within the aircraft by the pilot (controls not shown) through cable 24. The propeller 23 will generally revolve at 4,000 RPM.

The aft end of the shaft 18 is attached to rotary piston type high pressure pump 16, supported by bearing brace 19. The pistons, or plungers (not shown), of the pump 16, repeat reciprocation with rotation of the driving shaft 18. The high pressure pump 16 can deliver insecticides pressures to the optimum pressure of 6,000 psi. Insecticides are pumped from the tank 20, located in the interior of the aircraft 11, through the hose 21. The high pressure insecticide is fed through the outlet of the pump 16 to the spray boom 14 with nozzles 15 mounted on the outside surface.

Nozzles 15 consist of impingement elements with the insecticide droplets (10 microns of each drop) being created by the force of the high pressure insecticide hitting the pointed, impingement surface. A pressure gauge may be mounted on the spray boom 14 (not shown). The resulting spray with the high pressure impingement nozzles 15, with the aircraft flying at 150 MPH, at 300 feet, will create a fog, two miles wide, which lasts for as long as 5 hours. Approximate volume of insecticides used is 2 gallons per minute. In a preferred embodiment, a BETE PJ-12 "impingement" nozzle was used.

FIGS. 5 and 6 show a comparison of the average process control variables between 50 psi to 6,000 psi. Applicant has dedicated a considerable amount of time, in an effort to improve the existing HI-Pressure spray system technology and have as a consequence, managed to develop the most efficient spray system in use today. Using a wind tunnel, equipped with a Malvern laser measuring device, a series of tests using an actual product, Dibrom #14 were conducted.

Below is a synopsis of seven tests that were run and high light pertinent aspects of these tests.

a. Spraying Systems 8005 flat fan nozzle at 50 psi came in at 5.1% efficient with 27.8% of the total volume under 50 microns.

b. Spraying Systems M-1 nozzle at 3,000 psi was 24.9% efficient with 89.7% of the total volume under 50 microns.

c. Spraying Systems M-1 nozzle at 6,000 psi was 38.6% efficient with 97.2% of the total volume under 50 microns.

d. BETE PJ-12 nozzle at 3,000 psi was 44.2% efficient with 98% of the total volume under 50 microns.

e. BETE PJ-12 nozzle at 6,000 psi was 57.4% efficient with 99.3% of the total volume under 50 microns.

f. BETE PJ-10 nozzle at 7,500 psi was 57.6% efficient with 99.9% of the total volume under 50 microns.

Note 1: The "efficiency" rating was established on the basis of a study conducted by Dr. Gary Mount some 30 years ago.

Note 2: A new standard proposed by the EPA will allow no more than 5% of spray volume to go above 50 microns. Consequently, a separate breakdown has been provided for the wind tunnel print out listing this number.

Note 3: Applicant's experience basis has been 21 million acres with the flat fan 8005 nozzle, 2 million acres using the Hi-Pressure system with the M-1 nozzle at 3,000 psi with a 50% reduction, 1 million acres at 6,000 psi using the M-1 nozzle with a 75% product reduction.

It has therefore been shown that Applicant's high pressure spray achieves the optimum efficiency of pesticides. The ability to vary the pitch of the feathering propeller while changing the direction or speed of the aircraft, provides a constant, effective spray. The instant invention provides a widespread insecticide fog which sticks to the wings of insects and increases the mortality rate. Reducing the amount of pesticide used thereby reducing the mortality rate of fiddler crabs and other species.

Although the invention has been described by way of example and with reference to possible embodiments it is to be appreciated that improvements and/or modifications may be made to these embodiments without departing from the scope of the invention.

What is claimed is:

1. A combination of an aircraft and high pressure spraying apparatus for spraying suspensions/solutions of insecticides having predetermined characteristics independent of the speed of the aircraft carrying out the spraying, said apparatus comprising:

a mounting frame being attached to the underside of said aircraft, said frame having a plurality of bearing braces, said bearing braces being reinforced with a plurality of brackets affixed downwardly from said frame, a propeller shaft mounted through said bearing braces, said propeller shaft having a forward end and an aft end, a full feathering propeller being mounted on said forward end of said propeller shaft, said propeller having a control cable attached thereto, said cable extending to the cockpit of said aircraft and being controlled by an operator in said aircraft, a rotary piston high pressure pump being mounted on said aft end of said propeller shaft, the input side of said pump being connected to a tank mounted in the interior of said aircraft, a spray boom having a forward end and an aft end, said spray boom having a forward end attached to said mounting frame, below the tail end of said aircraft, and being connected to the output side of said rotary piston pump, and a plurality of spray nozzles being attached to said aft end of said spray boom said spray boom having a plurality of nozzles, said nozzles having impingement elements for creating insecticide droplets by force of high pressure insecticide hitting pointed, impingement surfaces.

2. A combination of an aircraft and spraying apparatus according to claim 1 wherein said spray nozzles consist of BETE PJ-12 impingement nozzles.

\* \* \* \* \*